UNITED STATES PATENT OFFICE.

REES B. SMITH, OF MOUNT PLEASANT, OHIO.

IMPROVED COMPOSITION FOR WELDING AND BRAZING.

Specification forming part of Letters Patent No. 56,815, dated July 31, 1866.

*To all whom it may concern:*

Be it known that I, REES B. SMITH, of Mount Pleasant, in the county of Jefferson and State of Ohio, have made a new and useful Improvement in Compositions for Welding and Brazing; and I do hereby declare the following to be a full, clear, and exact description of the nature and composition of the same, sufficient to enable one skilled in the art to which it is allied to compound and use the same.

The principal ingredient in the compound consists of a red clayey material found in abundance in Jefferson county, Ohio, and in some adjoining counties, and which is locally known as "Smith's mineral." Its composition is about as follows:

| | |
|---|---:|
| Silica | 37.35 |
| Peroxide of iron | 7.50 |
| Alumina | 12.70 |
| Lime | 4.98 |
| Magnesia | 10.31 |
| Carbonic acid | 15.25 |
| Water | 12.00 |
| | 100.09 |

From the above it may be safely assumed that the substance consists of the following compounds:

| | |
|---|---:|
| Hydrous silicate of iron and alumina | 69.55 |
| Carbonate of lime | 8.98 |
| Carbonate of magnesia | 21.65 |
| | 100.18 | which shows a somewhat unusual preponderance of magnesia over lime.

Throwing aside the carbonic acid and water, which are soon expelled by heat, the residue consists of nearly equal parts of silicic acid and the fluxing bases oxide of iron, alumina, lime, and magnesia. It is these bases and their large proportion which chiefly determine the principal property of the mineral in the fire and its fluxing power.

To the above substance, powdered for convenience, a small portion—say, from one to five per cent.—of manganese is added.

The fluxing compound thus obtained is used in welding in much the same manner as usual with other materials. The pieces of iron or steel, being coated with this compound, are heated and then welded together, the fluxing compound enabling the adjacent surfaces of the metals to coalesce intimately.

Cast-steel surfaces may be thus united with readiness, the joining being undistinguishable.

The metallic surface coated with this flux may be heated to a greater degree without injury than is possible with borax or other fluxes or in the absence of a flux, as the composition retains the carbon in the steel when at a high heat.

In brazing, the said fluxing composition is laid in connection with the spelter, brass, or copper against the pieces to be joined, the whole being then heated to the required degree.

There is nothing peculiar in the mechanical manipulation or treatment of the composition in welding or brazing.

The mineral which forms the major part of the above compound is fusible, of a bluish-brown color when exposed to the atmosphere, is of about the specific gravity of common iron ore, and is insoluble in water.

What I claim as new, and desire to secure by Letters Patent, is—

The fluxing or welding composition substantially as described.

The above specification of my improved composition for welding and brazing signed this 14th day of May, 1866.

REES B. SMITH.

Witnesses:
ALEXR. A. C. KLAUCKE,
EDWARD H. KNIGHT.